United States Patent [19]
Haas et al.
[11] Patent Number: 4,897,309
[45] Date of Patent: Jan. 30, 1990

[54] CONSOLIDATION OF THE SURFACES OF PARTICULATE ADSORBENTS

[75] Inventors: Franz Haas; Gerold Schreyer, both of Ludwigshafen, Fed. Rep. of Germany

[73] Assignee: BASF Aktiengesellschaft, Ludwigshafen, Fed. Rep. of Germany

[21] Appl. No.: 213,633

[22] Filed: Jun. 30, 1988

[30] Foreign Application Priority Data

Jul. 17, 1987 [DE] Fed. Rep. of Germany ....... 3723687

[51] Int. Cl.⁴ ........................... B05D 7/00; B32B 5/16

[52] U.S. Cl. .................................... 428/403; 427/214; 427/221; 428/407

[58] Field of Search ................ 427/214, 221; 428/403, 428/407

[56] References Cited

U.S. PATENT DOCUMENTS

| | | | |
|---|---|---|---|
| 4,162,348 | 7/1979 | Juzu et al. | 427/214 X |
| 4,535,004 | 8/1985 | Haas et al. | 427/212 |
| 4,535,005 | 8/1985 | Haas et al. | 427/212 |

*Primary Examiner*—Michael Lusignan
*Attorney, Agent, or Firm*—Oblon, Spivak, McClelland, Maier & Neustadt

[57] ABSTRACT

The surfaces of particulate adsorbents are consolidated by a process in which the adsorbent is impregnated with a cationic aqueous polymer solution and then treated with an anionic aqueous dispersion of a polymer having a softening point of from 60° to 150° C. and the materials are dried together.

8 Claims, No Drawings

CONSOLIDATION OF THE SURFACES OF PARTICULATE ADSORBENTS

BACKGROUND OF THE INVENTION

Adsorbents, such as active carbons, which are generally used in particulate form in industrial adsorption processes tend as a rule to form dusts, particularly under mechanical load, as occur, for example, during filling into adsorption apparatuses or especially during use in an agitated bed. The abrasion occurring under such a mechanical load may present serious problems in further process steps; in particular, abrasion of this type may make it virtually impossible to use many particulate adsorbents in an agitated bed. To avoid these disadvantages, U.S. Pat. No. 4,535,005 has provided a process for the consolidation of the surfaces of the particulate adsorbents, in which from 25 to 90% of the adsorbents is first covered with water and then heated at a temperature at which the adsorbed water evaporates and, as long as absorbed water evaporates, is treated with aqueous dispersions of self-crosslinking copolymers, with mixing, and the copolymers are then crosslinked with heating at 110°-180° C.. However, this process is relatively energy-consumptive and furthermore has the disadvantages that the adsorbents are immersed beforehand in water and polymer dispersions rendered specifically heat-sensitive and containing reactive groups are employed.

Furthermore, U.S. Pat. No. 4,535,004 discloses a process for the consolidation of the surfaces of particulate adsorbents, in which the adsorbent, which initially contains virtually no water, is treated with an aqueous suspension of filament-like structures of self-crosslinking copolymers, the filament-like structures being deposited on the surfaces of the adsorbent, the water absorbed by the adsorbent being evaporated and the adsorbent covered with the filament-like structures being heated to 110°-180° C. and the copolymers crosslinking. This process, which is likewise energy-consumptive, furthermore has the disadvantage that some of the filament-like structures are removed from the adsorbent by abrasion by mixing in a running drum and non-uniform layers are thus obtained.

SUMMARY OF THE INVENTION

We have found that the surface of particulate adsorbents can be advantageously consolidated by coating with an aqueous polymer dispersion by a process in which the dry adsorbent is impregnated with a cationic aqueous polymer solution, excess polymer solution is removed, drying is carried out if necessary and the surface of the impregnated adsorbent is coated by treatment with an anionic aqueous dispersion of a polymer having a softening point of from 60° to 150° C., and the coated adsorbent is dried in a conventional manner.

DETAILED DESCRIPTION OF THE PREFERRED EMBODIMENTS

Particulate adsorbents which are industrially important and whose surfaces can be consolidated according to the invention are, for example, carbon-containing adsorbents, such as active carbon, active coke and carbon molecular sieves, active clays which are obtained, for example, by dehydration and calcination of aluminum hydroxides, and silica gels and molecular sieve zeolites, as derived from natural and synthetic, hydrolyzed aluminosilicates of monoacidic or polyacidic bases. Preferably used particulate adsorbents are active carbons. The inner surface area of the active carbons is in general from 400 to 1,600 $m^2$ per g, while the inner surface area of the adsorbents is from 100 to 1,000 $m^2$ per g. In general, the particulate adsorbents have a mean particle diameter of from 0.3 to 9 mm, in particular from 2 to 5 mm. In the novel process, the adsorbents, which need not be predried, are first impregnated with a cationic aqueous polymer solution, for example by spraying or by introduction into the cationic polymer solution and subsequent removal of excess polymer solution. Particularly suitable cationic polymers are ethyleneimine polymers, for example polyethyleneimine, which generally have molecular weights (determined by the light scattering method) of from $0.6\times10^5$ to $1.6\times10^6$, in particular from $1.8\times10^5$ to $1.4\times10^6$. Ethyleneimine polymers of this type are commercially available. They are used for the novel process in general in the form of a 0.2-10, preferably 0.4-0.8, % strength aqueous solution. Any excess cationic polymer solution present during impregnation of the particulate adsorbents can be removed, for example by filtration or centrifuging.

The impregnated adsorbents can, if desired, be dried for intermediate storage or can be treated with an anionic aqueous polymer dispersion directly after the impregnation, in a moist stage. The aqueous polymer dispersion generally has a concentration of from 1 to 50, preferably from 5 to 20, % by weight, and the polymers have a softening point (measured according to DIN 53,460) of up to 150° C., preferably from 80° to 120° C.. Treatment of the impregnated adsorbents with the anionic polymer dispersion can be carried out, for example, by spraying or immersion of the adsorbents, and the weight ratio of impregnated active carbon to anionically dispersed polymer is in general from 99.5:0.5 to 90:10, preferably from 99.6:0.4 to 97:3. The polymers of the anionic aqueous polymer dispersion generally contain predominant amounts of styrene and/or acrylonitrile and may additionally contain copolymerized $\alpha,\beta$-monolefinically unsaturated mono- and/or dicarboxylic acids of 3 to 5 carbon atoms, such as, in particular, acrylic acid, methacrylic acid or itaconic acid, generally in amounts of from 1 to 8, in particular from 2 to 6, % by weight, based on the copolymers, as well as from 0.2 to 3% by weight of amides of such carboxylic acids, such as acrylamide. Other suitable comonomers are acrylates and methacrylates of alkanols of 1 to 4 carbon atoms, methyl methacrylate, methyl acrylate, ethyl acrylate and butyl acrylate as well as butadiene, in amounts of, in general, only up to 30% by weight. The anionically dispersed polymers may furthermore be derived from predominant amounts of methacrylate, suitable comonomers being acrylic or methacrylic acid and ethylacrylate and/or n-butylacrylate, in small amounts. For example, the following have proven useful:

1. A 40% strength aqueous dispersion of a copolymer of 75% by weight of acrylonitrile, 28% by weight of n-butylacrylate and 5% by weight of acrylic acid, having a softening point of 110° C..
2. A 50% strength aqueous dispersion of a copolymer of 80% by weight styrene, 15% by weight of acrylonitrile and 5% by weight of acrylic acid, having a softening point of 84° C.. 3. A 50% strength aqueous polystyrene dispersion having a softening point of 104° C.. 4. A 50% strength aqueous dispersion of a copolymer of 87% of styrene, 10% of butadiene, 2% of acrylic acid and 1% of methacrylamide. having a softening point of 79° C.. 5. A 50% strength aqueous dispersion of a copolymer of 71.3% of stryene, 14.5% of butadiene, 71.3% of styrene, 14.5% of butadiene, 10% of acrylonitrile, 3.9% of acrylic acid and 0.3% of methacrylamide, having a softening point of 109° C..

During impregnation of the adsorbents, the weight ratio of adsorbent, eg. active carbon (cationic) to polymer is in general from 97:3 to 99.8:0.2, preferably from 99.6:0.4 to 99:1.0.

For the Examples below, a 0.5% strength aqueous polyethyleneimine solution (molecular weight 1 x $10^6$) used for impregnating active carbon, and the 10% strength anionic polymer dispersions designated dispersions 1 to 5 are employed for coating the impregnated active carbons. The percentages stated therein are by weight.

EXAMPLES 1 TO 5

Commercial active carbons having the properties stated in the Table below are impregnated with the polyethyleneimine solution in the proportions stated there, by gently stirring the active carbons for 30 minutes with excess polyethyleneimine solution in a container. The impregnated active carbon is filtered off, residual polyethyleneimine solution is removed by centrifuging, and the impregnated active carbons are immersed in the 10% strength aqueous anionic polymer dispersions 1 to 5. After repeated stirring, the active carbons which are now coated with the polymers are filtered off and are dried at 180° C.. The weight ratio of polymer to impregnated active carbon, which is determined by weighing the coated active carbons after drying, is likewise stated in Table 1.

and the weight obtained on reweighing being determined in % by weight. The values obtained are summarized in Table 2 below.

The adsorptivity of the coated and uncoated active carbons is tested by introducing samples to be investigated into an absorption apparatus and passing through a polyol/nitrogen mixture containing 1,650 ppm of toluene, at room temperature, until final saturation of the active carbons with toluene. The adsorptivities thus measured are summarized in Table 2 below.

TABLE 2

| Coated active carbon Example | Adsorptivity [%] | | Abrasion loss [%] after 72 hours | |
|---|---|---|---|---|
| | of the untreated active carbon | of the coated active carbon | of the untreated active carbon | of the coated active carbon |
| 1 | 38 | 36 | 0.30 | 0.04 |
| 2 | 45 | 42 | 3.00 | 0.60 |
| 3 | 36 | 34 | 2.60 | 0.60 |
| 4 | 37 | 35 | 3.00 | 0.90 |
| 5 | 34 | 32 | 3.00 | 0.30 |

We claim:

1. A process for the consolidation of the surfaces of a particulate adsorbent by coating with an aqueous polymer dispersion, said process comprising:
(i) impregnating a dry particulate adsorbent with a cationic aqueous polymer solution;
(ii) removing excess polymer solution;
(iii) coating the impregnated adsorbent by treatment with an anionic aqueous dispersion of a polymer having a softening point of from 60° to 150° C.; and
(v) drying the coated adsorbent.

2. The process of claim 1, wherein, subsequent to said removal of said excess polymer solution, the impregnated adsorbent is dried.

TABLE 1

| No. | Active carbon | | Impregnating | | Coating | |
|---|---|---|---|---|---|---|
| | Dimensions | Inner surface area [$m^2/g$] | Polyethyleneimine solution | Weight ratio of polyethyleneimine to active carbon | Polymer dispersion no. | Weight ratio of polymer to active carbon |
| 1 | ϕ = 3 mm L = 8-10 mm | 700 | | 98:0.5 | 1 | 98.5:1.5 |
| 2 | ϕ = 4 mm L = 5-7 mm | 1500 | | 99:0.5 | 2 | 99.5:0.5 |
| 3 | ϕ = 4 mm L = 6-8 mm | 1000 | | 99:0.5 | 3 | 99.5:0.5 |
| 4 | ϕ = 4 mm L = 6-8 | 1000 | | 99:0.5 | 4 | 99.5:0.5 |
| 5 | ϕ = 4 mm L = 5-7 mm | 1000 | | 98:0.5 | 5 | 98.5:1.5 |

Note:
ϕ = mean diameter
L = mean length

This procedure gives abrasion-resistant active carbons which are coated with a porous polymer film and whose adsorption properties are essentially retained, as shown by the following Test for the particulate coated active carbons The abrasion loss was determined by a procedure in which 50 g samples of the active carbon were treated with steam until the active carbons no longer absorbed any moisture, the treatment of the active carbons being carried out in a perforated cylinder incorporated in a rolling container in the course of 72 hours under airtight conditions on a roll mill, and the active carbon remaining in the perforated cylinder then being weighed and the difference between the sample weight 3. The process of claim 1, wherein said adsorbent is impregnated with a 0.2 to 10% strength aqueous polyethyleneimine solution.

4. The process of claim 1, wherein said adsorbent is coated with a 5 to 20% strength aqueous anionic dispersion of a polymer having a softening point from 60° to 100° C..

5. A particulate adsorbent obtained by a process for the consolidation of the surfaces of a particulate adsorbent by coating with an aqueous polymer dispersion, said process comprising:
(i) impregnating a dry particulate adsorbent with a cationic aqueous polymer solution;
(ii) removing excess polymer solution;

(iii) coating the impregnated adsorbent by treatment with an anionic aqueous dispersion of a polymer having a softening point of from 60° to 150° C.; and (iv) drying the coated adsorbent.

6. The particulate adsorbent of claim 5, wherein, subsequent to said removal of said excess polymer solution, the impregnated adsorbent is dried.

7. The particulate adsorbent of claim 5, wherein said adsorbent is impregnated with a 0.2 to 10% strength aqueous polyethyleneimine solution.

8. The particulate adsorbent of claim 5, wherein said adsorbent is coated with a 5 to 20% strength aqueous anionic dispersion of a polymer having a softening point from 60° to 100° C..

* * * * *